United States Patent Office 3,778,452
Patented Dec. 11, 1973

3,778,452
1-ALKENYL-9,10-ANTHRAQUINONES
Alden D. Josey and Jack R. Kirchner, Wilmington, Del., assignors to E. I. du Pont de Nemours and Company, Wilmington, Del.
No Drawing. Filed Oct. 9, 1970, Ser. No. 79,642
Int. Cl. C07c 49/68
U.S. Cl. 260—369
8 Claims

ABSTRACT OF THE DISCLOSURE

There are disclosed certain 1-alkenyl-9,10-anthraquinones of the formula

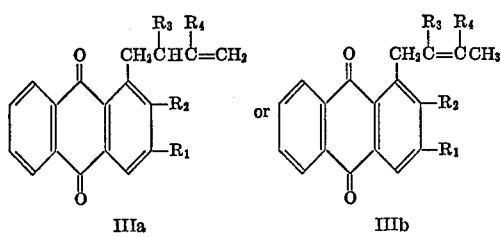

IIIa       IIIb wherein each of $R_1$ and $R_4$ is an alkyl grou, or either is an alkyl group and the other is hydrogen; and each of $R_2$ and $R_3$ is an alkyl group or hydrogen, provided that $R_2$ is always hydrogen when each of $R_1$ and $R_3$ is hydrogen, which alkyl group or groups are 1–8 carbon straight chain hyrocarbon alkyl groups. Also disclosed is a method for preparing such substituted anthraquinones of Formula IIIa which involves effecting a Diels-Alder condensation between 1,4-naphthoquinone and an alkyl substituted 1,3,7-octatriene of the formula

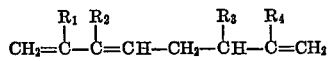

wherein $R_1$, $R_2$, $R_3$ and $R_4$ are as defined above; partially oxidizing the resulting adduct which is a 1,4,4a,9a-tetrahydro-1-alkenylanthraquinone with either cupric acetate, or with oxygen or air in the presence of a weak base to obtain a 1,4-dihydro-1-alkenyl-anthraquinone; and then further oxidizing the latter with oxygen or air in the presence of a strong base such as potassium hydroxide. Alternatively, the adduct from the Diels-Alder condensation can be converted directly to the anthraquinone of Forfula IIIa by oxidation with oxygen or air in the presence of a strong base such as potassium hydroxide. Heating the compounds of Formula IIIa in the presence of a strong acid such as p-toluene sulfonic acid rearranges their structure to that of Formula IIIb.

The above 1-alkenyl anthraquinones can be converted to tetrahydro-1-alkylanthraquinones that are outstandingly useful as working intermediates in cyclic reduction-oxidation methods for producing hydrogen peroxide.

CROSS-REFERENCE TO RELATED CASE

The preparation of the alkyl substituted 1,3,7-octatrienes used in the Diels-Alder condensations with 1,4-naphthoquinone in accordance with the present invention is described in our application, Ser. No. 79,644, filed of even date herewith. Use of the 1-alkylanthraquinones of the present invention in the production of 5,6,7,8-tetrahydro-1-alkylanthraquinones, and the use of the latter as working intermediates in cyclic reduction-oxidation methods for producing hydrogen peroxide, are described in the application of Kirchner and Vaughan, Ser. No. 79,643, filed Oct. 9, 1970, now abandoned.

BACKGROUND OF THE INVENTION

Field of the invention

This invention relates to 1-alkenylanthraquinones and to their preparation by the condensation of 1,4-naphthoquinone with certain alkyl substituted 1,3,7-octatrienes to give adducts which yield the 1-alkenylanthraquinones upon oxidation.

Prior art

Carothers U.S. Pat. 2,072,867, issued Mar. 9, 1937, discloses the reaction of naphthoquinone with 2-alkyl-1,3-butadienes to give 1,4,4a,9a-tetrahydro - 2 - alkyl - 9,10-anthraquinones and the oxidation of the latter compounds by air in the presence of potassium hydroxide to give 2-alkylanthraquinones. Smutny U.S. Pat. 3,267,169, issued Aug. 16, 1966, discloses that 1,3,7-octatriene, 3,6-dimethyl-1,3,7-octatriene and 3,7-dimethyl-1,3,7-octatriene can be employed as the dienophile in Diels-Alder condensations. However, no condensations ethreof with naphthoquinone and no conversion of the resulting adducts to 1-alkenylanthraquinone compounds are disclosed.

SUMMARY OF THE INVENTION

One embodiment of the invention is a 1,4,4a,9a-tetrahydro-1-alkenyl-9,10-anthraquinone of the formula

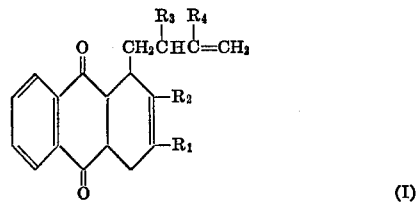

(I)

wherein each of $R_1$ and $R_4$ is an alkyl group, or either is an alkyl group and the other is hydrogen; and each of $R_2$ and $R_3$ is an alkyl group or hydrogen, provided that $R_2$ is always hydrogen when each of $R_1$ and $R_3$ is hydrogen, which alkyl group or groups are 1–8 carbon straight chain hydrocarbon alkyl groups.

Another embodiment of the invention is a 1,4-dihydro-1-alkenyl-9,10-anthraquinone of the formula

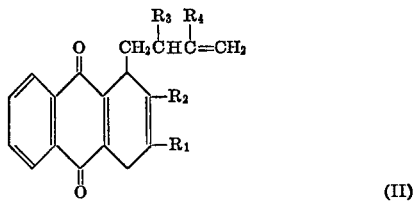

(II)

wherein $R_1$, $R_2$, $R_3$ and $R_4$ are as defined above.

Still another embodiment of the invention is a 1-alkenyl-9,10-anthraquinone of the formula

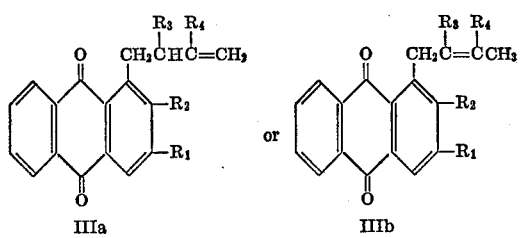

IIIa       IIIb wherein $R_1$, $R_2$, $R_3$ and $R_4$ are as defined above.

Yet another embodiment of the invention is a method for preparing a 1-alkenylanthraquinone of Formula IIIa, which method comprises effecting a Diels-Alder condensation reaction between 1,4-naphthoquinone and an alkyl substituted 1,3,7-octatriene of the formula

wherein $R_1$, $R_2$, $R_3$ and $R_4$ are as defined above, to obtain tetrahydroalkenylanthraquinone of Formula I; axidizing the latter with molecular oxygen in the presence of a weak base, or with cupric acetate, to yield a 1,4-dihydro-1-alkenylanthraquinone of Formula II; then further oxidizing the latter with molecular oxygen in the presence of a strong base. Alternatively and preferably, the tetrahydroalkenylanthraquinone of Formula I may be converted directly to the 1-alkenylanthraquinone of Formula IIIa by oxidation with molecular oxygen in the presence of a strong base.

A still further embodiment of the invention is a method for converting a 1-alkenylanthraquinone of Formula IIIa to a 1-alkenylanthraquinone of Formula IIIb, which method comprises heating a 1-alkenylanthraquinone of Formula IIIa in the presence of a strong acid such as p-toluene sulfonic acid.

DETAILED DESCRIPTION AND PREFERRED EMBODIMENTS

The 1-alkenylanthraquinones of the invention are prepared according to the following reactions:

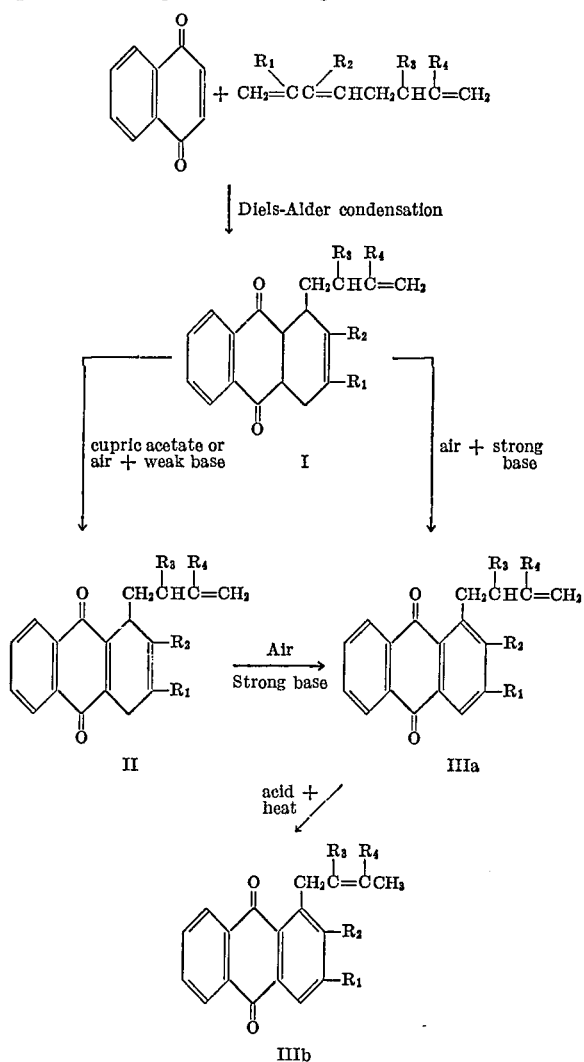

The Diels-Alder condensation reaction to produce the 1,4,4a,9a-tetrahydro-1-alkenylanthraquinone of Formula I is carried out by contacting 1,4-naphthoquinone and an alkyl substituted 1,3,7-octatriene as defined below at a temperature from about 25 to 150° C. until the desired condensation has occurred. The preferred reaction temperatures range from about 75 to 125° C. The reaction can be carried out in either the presence or the absence of a solvent, although the presence of an organic solvent or diluent is generally preferred. When a solvent is used, it should be one that is inert towards each reactant and the condensation adduct and is preferably a solvent for at least one of the reactants and preferably both. Suitable solvents are: ketones such as acetone and methyl ethyl ketone; ethers such as tetrahydrofuran and dioxane; alcohols such as methanol, ethanol and isopropanol; esters such as ethyl acetate; and hydrocarbons such as benzene and cyclohexane. The condensation adducts can be separated from the reaction mixture, if separation is desired, by conventional methods, e.g., by cooling the reaction mixture to crystallize out the adduct, which can then be removed by filtration, or by evaporating off the solvent, if a solvent is used. Ordinarily, separation of the adduct from the reaction mixture will not be necessary. Generally, the naphthoquinone and octatriene reactants will be employed in approximately equimolar proportions, although either may be employed in considerable excess if desired.

The alkyl substituted octatrienes that can be used in carrying out the Diels-Alder condensations with 1,4-naphthoquinone are those of the formula

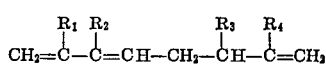

in which each of $R_1$ and $R_4$ is an alkyl group, or either is an alkyl group and the other is hydrogen; and each of $R_2$ and $R_3$ is an alkyl group or hydrogen, provided that $R_2$ is always hydrogen when each of $R_1$ and $R_3$ is hydrogen, which alkyl group or groups are 1–8 carbon straight chain hydrocarbon alkyl groups. They can be prepared, as described in our application, Ser. No. 79,644, filed of even date herewith, by: (A) homodimerizing (a) a monoalkyl butadiene of the formula

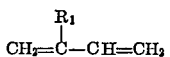

or (b) a dialkyl butadiene of the formula

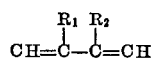

in which formulas, $R_1$ and $R_2$ are 1–8 carbon straight chain hydrocarbon alkyl groups; or (B) codimerizing (a) 1,3-butadiene and one such monoalkyl butadiene or one such dialkyl butadiene, or (b) two different such monoalkyl butadienes or two different such dialkyl butadienes, or (c) one such monoalkyl butadiene and one such dialkyl butadiene, in the presence of a catalyst which is a dienophile-coordinated palladium-phosphine complex at a temperature of 25 to 150° C., preferably 75 to 125° C. Preferred catalysts of the above type are bis(triphenylphosphine) (maleic anhydride)palladium and bis(triphenylphosphine) (p-benzoquinone)palladium. Such catalysts should be employed at concentrations sufficient to cause the homodimerization or codimerization reaction to proceed at a practical rate. Catalyst concentrations, based upon the weight of the reaction mixture, of from 0.1 to 5% are effective and concentrations of from about 0.5 to 2% are preferred. The reactions can be carried out effectively in the absence of any solvent or diluent, although the use of a solvent such as acetone or methyl ethyl ketone is generally preferred. Generally, the reaction will be carried out under autogenous pressure to insure the maintenance of liquid phase reaction conditions during reaction times of from 3 to 10 hours under the preferred temperature conditions.

The homodimerization of a monoalkyl butadiene as described above yields mainly a 2,7-dialkyl-1,3,7-octatriene in which the two alkyl substituent groups are the same as the alkyl substituent group of the parent butadiene. The dimerization of a dialkyl butadiene in which the two alkyl groups are the same yields a 2,3,6,7-tetra-alkyl-1,3,7-octatriene in which all the alkyl groups are the same. When the alkyl groups of the dialkyl butadiene are different, several tetraalkyl-1,3,7-octatrienes are possible with the dominant product having the larger alkyl groups in the 2 and 7 positions. Similarly, when 1,3-butadiene is codimerized with a monoalkyl butadiene of the above type, both a 7-alkyl-1,3,7-octatriene and a 2-alkyl-1,3,7-octatriene are produced with the former predominating. Thus, all such homodimerization and codimerization reactions carried out as described appear to proceed so as to yield as the dominant product of any given reaction, where several products are possible, that substituted 1,3,7-octatriene which will have the larger alkyl groups in the 2 and 7 positions with the largest group in the 7 position.

Illustrative of such alkyl substituted octatriene reactants, all of which can be prepared as described above, are: 7-methyl-1,3,7-octatriene, 2-methyl-1,3,7-octatriene, 7-ethyl-1,3,7-octatriene, 2-ethyl-1,3,7-octatriene, 2,7-dimethyl-1,3,7,-octatriene, 2,7-diethyl-1,3,7-octatriene, 2,7-di(n-butyl)-1,3,7-octatriene, 2-methyl-7-ethyl-1,3,7-octatriene, 2-ethyl-7-methyl-1,3,7-octatriene, 6,7-dimethyl-1,3,7-octatriene, 2,3-dimethyl-1,3,7-octatriene and 2,3,6,7-tetramethyl-1,3,7-octatriene.

The oxidation of the 1,4,4a,9a-tetrahydro-1-alkenyl-anthraquinones of Formula I with molecular oxygen in the presence of a weak base readily converts such compounds to the 1,4-dihydro-1-alkenylanthraquinones of Formula II. Air is preferred as the source of molecular oxygen and ammonia, sodium acetate and the mono-, di- and trialkylamines such as methylamine, diethylamine, triethylamine and di-isopropylethylamine are examples of suitable weak bases. The reaction can be carried out in the absence of any solvent or diluent, although the presence of a medium such as water; an alcohol such as methanol or ethanol; a ketone such as acetone or methyl ethyl ketone; an ester such as ethyl acetate; or a hydrocarbon such as benzene or cyclohexane, is preferred. The preferred medium is aqueous ethanol. Reaction temperatures ranging from about 0 to 150° C. are generally suitable and the preferred temperatures range from about 20 to 50° C. The same oxidation to compounds of Formula II can also be effected using a cupric salt such as cupric chloride or cupric acetate (preferred) as the oxidant, e.g., in an aqueous acetic acid medium, under the above temperature conditions.

The oxidation of the 1,4-dihydro-1-alkenylanthraquinones of Formula II with molecular oxygen in the presence of a strong base readily converts such compounds to the 1-alkenylanthraquinones of Formula IIIa. Air is the preferred source of molecular oxygen. Suitable strong bases are the alkali metal hydroxides, of which potassium hydroxide is preferred, and strong organic bases such as diazabicyclononene and the quaternary ammonium hydroxides such as tetramethylammonium hydroxide. Although the presence of a solvent or diluent is not essential, it is preferred that the reaction be carried out in the presence of a solvent, and those indicated above as being suitable for the oxidation reaction to produce the anthraquinone compounds of Formula II are also suitable for use in the oxidation of the Formula II compounds to the anthraquinones of Formula IIIa. Similarly, the temperatures disclosed above for the oxidation to compounds of Formula II are also suitable for the oxidation of the latter to the anthraquinones of Formula IIIa.

Instead of oxidizing the Diels-Alder condensation adducts of Formula I stepwise (via compounds of Formula II as intermediates) to the anthraquinones of Formula IIIa as indicated above, the compound of Formula I can be oxidized directly to the compounds of Formula IIIa by means of molecular oxygen, preferably air, in the presence of a strong base. The strong bases that are suitable and the conditions for carrying out such direct oxidations are the same as described above for the oxidation of compounds of Formula II to compounds of Formula IIIa.

The 1-(3-butenyl)anthraquinones of Formula IIIa can be readily rearranged or converted to the 1-(2-butenyl) anthraquinones of Formula IIIb by heating the former at a temperature of 25 to 150° C., preferably 50 to 100° C., in the presence of an amount of a strong acid sufficient to catalyze the rearrangement. Examples of suitable strong acids are p-toluenesulfonic acid, benzenesulfonic acid, methanesulfonic acid, a strong organic acid such as trifluoroacetic acid, and a strong inorganic acid such as perchloric acid. Acid concentrations of 0.1 to 5% are suitable and those of 0.5 to 1% are preferred. Preferably, such rearrangement reaction is carried out in the presence of an organic solvent, examples of which are benzene, toluene, cyclohexane, tetrahydrofuran, and ethyl acetate.

The invention is illustrated by the following examples in which all proportions and compositions expressed as percentages are by weight.

EXAMPLE 1

A solution of 15.8 g. (0.1 gram mole) of 1,4-naphthoquinone and 13.6 g. (0.1 gram mole) 2,7-dimethyl-1,3,7-octatriene in 50 ml. of ethanol was heated at reflux for 2 hours. On cooling the reacted mixture, the Diels-Alder adduct, shown by its nuclear magnetic resonance (NMR) spectrum to be 1,4,4a,9a-tetrahydro-1-(3-methyl-3-butenyl)-3-methyl-9,10-anthraquinone, crystallized out. The yield was 22.5 g. or 76.5% of theory. A sample was withdrawn and recrystallized twice from ethanol to give feathery white crystals, M.P. 91–93° C.

Analysis.—Calc'd for $C_{20}H_{18}O_2$ (percent): C, 82.7; H, 6.25. Found (percent): C, 83.0; H, 6.28.

The remainder of the above adduct was added to a solution of 10.6 g. of potassium hydroxide in a mixture of 11 ml. of water and 100 ml. of ethanol. The resulting dark solution was oxidized by bubbling air therethrough at room temperature for about 20–24 hours. Water was then added to the reaction mixture and the crude quinone product which separated was collected by filtration, dissolved in benzene and the resulting solution was boiled to remove water. The benzene solution was passed through a column of activated alumina, and the yellow eluate was evaporated to leave a crystalline residue weighing 21 g. (75%). Recrystallization of the residue from methanol gave the product, shown by its NMR spectrum to be 1-(3-methyl - 3 - butenyl)-3-methyl-9,10-anthraquinone, in the form of yellow needles, M.P. 87–89° C.

Analysis.—Calc'd for $C_{20}H_{18}O_2$ (percent): C, 82.7; H, 6.25. Found (percent): C, 83.0; H, 6.28.

EXAMPLE 2

2,7-dimethyl-1,3,7-octatriene, 136 g. (1 gram mole), was heated to 90° C. under a nitrogen atmosphere and stirred while 158 g. (1 gram mole) of 1,4-naphthoquinone was added portionwise during 2 hours. When the addition was complete, the resulting dark mixture was heated at 110–115° C. for 2 hours, then poured into 500 ml. of ethanol. A solution of 28 g. (0.5 gram mole) of potassium hydroxide in 150 ml. of water was then added and a gentle stream of air was passed through the resulting mixture for 4.5 hours while ice cooling was applied. The yellow 1-(3 - methyl-3-butenyl)-3-methyl-9,10-anthraquinone formed was collected by filtration, washed on the filter with a 1:1 mixture of water and ethanol, then dried in nitrogen to give 242 g. 82.5% yield, of the dry product.

EXAMPLE 3

A solution of 2.9 g. (0.01 gram mole) of 1-(3-methyl 3-butenyl)-3-methyl-9,10 - anthraquinone) (prepared according to the method of Example 2) and 0.1 g. of p-toluene sulfonic acid in 100 ml. of benzene was stirred at reflux temperature for 1.5 hours. After extraction with water to remove the acid catalyst, the resulting solution was dried with magnesium sulfate, filtered and evaporated to dryness. The yield of bright yellow crystalline product, M.P. 110–115° C., was 2.85 g. (98.5%). The nuclear magnetic resonance (NMR) spectrum of the product indicated that it was a mixture containing 85% of a new quinone and 15% of the starting material. Purification thereof by recrystallization from ethanol gave the new quinone in crystalline form as yellow-orange prisms, M.P. 119–120° C. Its NMR spectrum established that this new quinone was 1-(3-methyl-2-butenyl)-3-methyl-9,10-anthraquinone formed by the rearrangement of the double bond in the butenyl substituent group from the original 3,4-position to the 2,3-position.

EXAMPLE 4

A mixture of 15.8 g. (0.1 gram mole) 1,4-naphthoquinone and 16.4 g. (0.1 gram mole) 2,7-diethyl-1,3,7-octatriene was heated in a nitrogen atmosphere at 80 to 100° C. for 1 hour. On cooling, the reaction mixture crystallized. The crude Diels-Alder adduct was recrystallized from methanol to give 22 grams (68.5% yield) of a product, shown by its NMR spectrum to be 1,4,4a,9a-tetrahydro-1-(3-ethyl-3-butenyl)-3-ethyl-9,10-anthraquinone, in the form of white needles, M.P. 84–85° C.

*Analysis.*—Calc'd for $C_{22}H_{26}O_2$ (percent): C, 82.0; H, 8.13. Found (percent): C, 81.8; H, 8.16.

A sample of the above purified adduct was dissolved in a solution of potassium hydroxide in ethanol and oxidized by the passage of air through the solution. The product formed (shown by its NMR spectrum to be 1-(3-ethyl-3-butenyl)-3-ethyl-9,10-anthraquinone) was collected, washed with water and recrystallized twice from methanol to give the product in the form of yellow needles, M. P. 79–80° C.

*Analysis.*—Calc'd for $C_{22}H_{22}O_2$ (percent): C, 83.0; H, 6.96. Found (percent): C, 82.8; H, 6.94.

EXAMPLE 5

A solution of 14.1 g. (0.09 gram mole) of 1.4-naphthoquinone and 10.9 g. (0.09 gram mole) of a mixture of 65% 7-methyl-1,3,7-octatriene and 35% 2-methyl-1,3,7-octatriene in 100 ml. of benzene was refluxed for 6 hours. There resulted a solution of two adduct products, 1,4,4a,9a-tetrahydro-1-(3-methyl-3-butenyl)-9,10-anthraquinone and 1,4,4a,9a-tetrahydro-1-(3-butenyl)-3-methyl-9,10-anthraquinone. An aliquot (2 ml.) of the product solution was withdrawn and the benzene was removed therefrom by evaporation under vacuum. Ethanol (5 ml.) and 2 drops of diazabicyclononene were added to the residue and the resulting dark solution was stirred in air. The yellow crystalline material which formed after 2–3 hours was collected, dried in air and chromatographed on acidic activated alumina. The bright yellow eluate was evaporated to give a mixture of crystalline quinones which was shown by their NMR spectra to consist of 65% 1-(3-methyl-3-butenyl)-9,10-anthraquinone and 35% 1-(3-butenyl)-3-methyl-9,10-anthraquinone. The remainder of the above solution of the original two adduct products was similarly treated. A total of 16 g. of a crude mixture of the two anthraquinones was obtained after chromatography. Recrystallization from methanol gave 4 g. of bright yellow prisms which was a 65:35 mixture of the above two anthraquinones.

EXAMPLE 6

A mixture of 17.64 g. (0.06 gram mole) of the tetrahydroanthraquinone of Example 1, 25.2 g. (0.126 gram mole) of cupric acetate monohydrate, 150 ml. of a 1:1 mixture of acetic and water, and 30 ml. of methanol was heated to 90° C. in 30 minutes and kept at 90–92° C. for 15 minutes. The resulting mixture was then poured into 1 liter of water and the heavy crystalline product formed was filtered off, washed well on the filter with water, and dried in a stream of nitrogen. The crude solid obtained was extracted with benzene on the filter until the washings were colorless. Evaporation of the yellow benzene filtrate gave 17.26 g. (98% yield) of pure 1,4-dihydro-1-(3-methyl-3-butenyl)-3-methyl-9,10-anthraquinone, M.P. 60–61° C.

*Analysis.*—Calc'd for $C_{20}H_{20}O_2$ (percent): C, 82.15; H, 6.98. Found (percent): C, 81.85; H, 6.90. Mol. wt. (mass. spec.): Calc'd.: 292; found: 292.

The same dihydroanthraquinone was obtained when a mixture of 1 gram of the tetrahydroanthraquinone of Example 1, 15 ml. of ethanol and 4 drops of a 4 N aqueous solution of ammonium hydroxide was stirred for 1 hour at 25° C. under a slow stream of air. The yellow crystalline product was collected, washed with water and dried to give 0.91 grams of the product (92% yield).

EXAMPLE 7

About 8.0 g. of the Diels-Alder adduct of Example 4, which was 1,4,4a,9a-tetrahydro-1-(3-ethyl-3-butenyl)-3-ethyl-9,10-anthraquinone, was dissolved in 75 ml. of ethanol containing 5 ml. of water and 1 ml. of 15 N aqueous solution of ammonium hydroxide. The resulting dark solution was stirred vigorously in contact with air in an open beaker for 5 hours. During this time, a yellow-orange oil separated from the solution. The mixture was extracted with benzene and the extract was washed well with water, then dried over magnesium sulfate. Evaporation of the dry solution gave a viscous yellow oil whose NMR spectrum established its structure as 1,4-dihydro-1-(3-ethyl-3-butenyl)-3-ethyl-9,10-anthraquinone.

The 2,7-dimethyl-1,3,7-octatriene employed in Examples 1 and 2 was prepared by dimerizing 2-methyl-1,3-butadiene in acetone in the presence of bis(triphenylphosphine)-(maleic anhydride)palladium as catalyst at 105° C. under autogeneous pressure. The 2,7-diethyl-1,3,7-octatriene employed in Example 3 was prepared by a similar dimerization of 2-ethyl-1,3-butadiene. The 65:35 mixture of 7-methyl-1,3,7-octatriene and 2-methyl-1,3,7-octatriene was prepared by a similar codimerization of an equimolar mixture of 1,3-butadiene and 2-methyl-1,3-butadiene.

As disclosed in the application of Kirchner and Vaughan, Ser. No. 79,643, filed of even date herewith, the present 1-butenylanthraquinones of Formulas IIIa and IIIb are readily converted to 1-alkylanthraquinones of the Formula IV

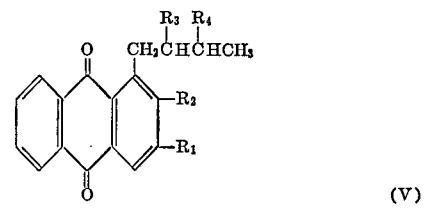

(V)

by hydrogenation in the presence of a platinum catalyst on a charcoal support. Hydrogenation in the presence of Raney nickel catalyst converts the 1-alkylanthraquinones of Formula IV to 5,6,7,8-tetrahydro-1-alkylanthraquinones of the Formula V

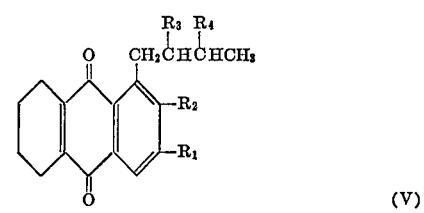

(V)

All of the terrahydro-1-alkylanthraquinones of Formula V are outstandingly useful as working intermediates in the well-known cyclic reduction-oxidation method for producing hydrogen peroxide. In such a method, a solution of an alkylanthaquinone or tetrahydroalkylanthraquinone in a water-immiscible solvent or mixture of solvents is reduced, e.g., by hydrogenation in the presence of a catalyst such as a supported metallic palladium catalyst or Raney nickel, to the corresponding alkylanthrahydroquinone or tetrahydroalkylanthahydroquinone; the resulting solution of the latter is oxidized, e.g., with oxygen or air, to reform the alkylanthraquinone or tetrahydroalkylanthraquinone and simultaneously produce hydrogen peroxide; the hydrogen peroxide is recovered by extraction with water from the solution of the alkylanthraquinone or tetrahydroanthraquinone, and the latter solution is recycled to the hydrogenation stage. The tetrahydro-1-alkylanthraquinones of Formula V can be used in such cyclic methods under the reduction and oxidation conditions commonly employed. Their use is particularly advantageous because of their high solubilities in both their reduced and oxidized forms in the water-immscible solvents and solvent mixtures commonly used, thereby making possible the production of a greater amount of hydrogen peroxide per cycle and the recovery of more concentrated hydrogen peroxide solutions in the hydrogen peroxide extraction step, than is possible when using less soluble anthraquinones or tetrahydroanthraqunones.

We claim:

1. A 1-alkenyl-9,10-anthraquinone derivative whose structural formula is that of Formula I, Formula II or Formula IIIa as follows:

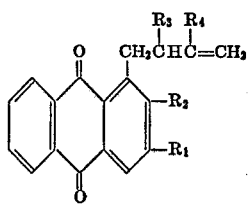

Formula I

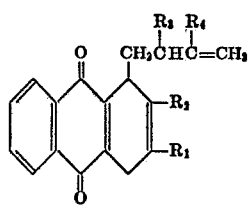

Formula II

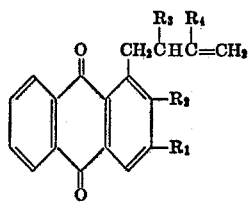

Formula IIIa in which formulas each of $R_1$ and $R_4$ is an alkyl group, or either is an alkyl group and the other is hydrogen; and each of $R_2$ and $R_3$ is an alkyl group or hydrogen, provided that $R_2$ is always hydrogen when each of $R_1$ and $R_3$ is hydrogen; said alkyl group or groups being 1 to 8 carbon straight chain hydrocarbon alkyl groups.

2. A 1-alkenyl-9,10-anthraquinone derivative whose structural formula is that of Formula I of claim 1.

3. A 1-alkenyl-9,10-anthraquinone derivative whose structural formula is that of Formula II of claim 1.

4. A 1-alkenyl-9,10-anthraquinone derivative whose structural formula is that of Formula IIIa of claim 1.

5. A 1-alkenyl-9,10-anthraquinone derivative according to claim 4, which derivative is 1-(3-methyl-3-butenyl)-3-methyl-9,10-anthraquinone.

6. A 1-alkenyl-9,10-anthraquinone derivative according to claim 4, which derivative is 1-(3-ethyl-3-butenyl)-3-ethyl-9,10-anthraquinone.

7. A 1-alkenyl-9,10-anthraquinone derivative according to clam 4, which derivative is 1-(3-methyl-3-butenyl)-9,10-anthraqunone.

8. A 1-alkenyl-9,10-anthraquinone derivative according to claim 4, which derivative is 1-(3-butenyl)-3-methyl-9,10-anthraquinone.

References Cited

UNITED STATES PATENTS

| | | | |
|---|---|---|---|
| 1,890,040 | 12/1932 | Lüttringhause et al. | 260—369 |
| 2,938,913 | 5/1960 | Weyker et al. | 260—369 |
| 2,652,408 | 9/1953 | Lecher et al. | 260—369 |

FOREIGN PATENTS

| 1,101,384 | 3/1961 | Germany | 260—369 |

OTHER REFERENCES

Günzl-Schumacher et al.: Chem. Ber. 93 pp. 974–978 (1960).

Cram et al.: Organic Chemistry, p. 504 (1964).

LORRAINE A. WEINBERGER, Primary Examiner

E. J. SKELLY, Assistant Examiner

U.S. Cl. X.R.

260—683 R; 423—588

PO-1050
(5/69)

UNITED STATES PATENT OFFICE
CERTIFICATE OF CORRECTION

Patent No. 3,778,452　　　　　　Dated December 11, 1973

Inventor(s) Alden J. Josey and Jack R. Kirchner

It is certified that error appears in the above-identified patent and that said Letters Patent are hereby corrected as shown below:

In Column 9, Claim 1, Formula I should appear as follows:

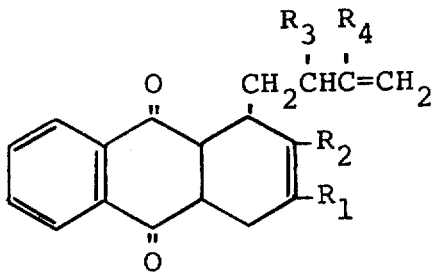

Formula I

In Column 10, line 21, "anthraqunone" should be -- anthraquinone --.

Signed and sealed this 23rd day of April 1974.

(SEAL)
Attest:

EDWARD M.FLETCHER,JR.　　　　　　　C. MARSHALL DANN
Attesting Officer　　　　　　　　　　Commissioner of Patents